United States Patent [19]
Martin et al.

[11] 4,235,172
[45] Nov. 25, 1980

[54] GRATE WITH COMPENSATING MEANS FOR USE IN INDUSTRIAL FURNACES

[75] Inventors: Johannes J. Martin; Walter J. Martin; Erich Weber, all of Munich, Fed. Rep. of Germany

[73] Assignee: Josef Martin Feuerungsbau GmbH, Munich, Fed. Rep. of Germany

[21] Appl. No.: 17,356

[22] Filed: Mar. 5, 1979

[30] Foreign Application Priority Data

Mar. 7, 1978 [DE] Fed. Rep. of Germany ....... 2809845

[51] Int. Cl.³ .................................................. F23B 1/22
[52] U.S. Cl. ..................................... 110/281; 110/271; 266/179; 432/245
[58] Field of Search ................ 110/281, 282, 283, 284, 110/285, 271; 266/179; 432/245

[56] References Cited

U.S. PATENT DOCUMENTS

| 3,413,938 | 12/1968 | Dvirka | 110/281 X |
| 4,096,809 | 6/1978 | Martin et al. | 110/271 |
| 4,103,627 | 8/1978 | Mainka | 110/281 |

*Primary Examiner*—Edward G. Favors
*Attorney, Agent, or Firm*—Peter K. Kontler

[57] ABSTRACT

A grate wherein several steps of alternating partly overlapping mobile and stationary grate bars are adjacent to a compensating device which expands or contracts to compensate for heat-induced variations of the width of adjacent steps. The compensating device supports or is adjacent to a sealing device having auxiliary bars which abut against the side faces of adjacent mobile grate bars and abut against the top faces of adjacent stationary grate bars. The side faces of the stationary bars are separated from the sealing device and from the compensating device by permanent clearances which are overlapped by the auxiliary bars. The auxiliary bars rest on the stationary bars and are biased against the side faces of the respective mobile bars by weights or springs of the compensating device.

17 Claims, 6 Drawing Figures

GRATE WITH COMPENSATING MEANS FOR USE IN INDUSTRIAL FURNACES

BACKGROUND OF THE INVENTION

The present invention relates to grates for use in industrial furnaces or the like, and more particularly to improvements in grates which comprise stationary and mobile grate bars, wherein mobile bars alternate with stationary bars and wherein each mobile bar overlaps in part a first stationary bar and is overlapped in part by a second stationary bar. Still more particularly, the invention relates to improvements in grates of the type wherein the marginal portions of outermost grate bars of each group of steps of the grate are adjacent to and cooperate with an expansible compensating device which reduces the likelihood of penetration of particles of solid matter between the frame and such marginal portions.

It is already known to provide a grate with compensating devices which serve to yield in response to heat-induced lateral expansion of adjacent steps of the grate and to expand in response to cooling of the adjacent steps. Reference may be had to commonly owned U.S. Pat. No. 4,096,809 granted June 27, 1978 to Martin et at. The patent to Martin et al. discloses and shows compensating devices along the lateral edges of a grate as well as between groups of steps of grate bars.

A drawback of many presently known compensating devices is that they cannot positively prevent penetration of particles of foreign matter into eventual crevices or gaps along the marginal portions of outermost grate bars. This is due to the fact that the purpose of compensating devices is to expand and contract in response to temperature changes. Penetration of particles of foreign matter between the mobile grate bars and the compensating device is not overly serious, at least under certain circumstances, because the mobile grate bars perform a self-cleaning action. Thus, if a particle of clinker, metal or fuel penetrates between a compensating device and the adjacent mobile (normally reciprocable) grate bars, such particle is likely to be squashed or expelled as a result of movements of grate bars with respect to the compensating device. However, any particles of foreign matter which penetrate between the compensating device and the stationary grate bars are likely to remain therein and to increase the width of clearance to thereby permit entry of additional (often larger) particles with the result that the width of the clearance increases gradually or stepwise. The width of such clearances can increase to such an extent that the compensating device is fully compressed and cannot yield in response to expansion of grate bars as a result of heating. Once such condition arises, further lateral expansion of grate bars results in development of stresses which are likely to affect the operation of the grate, to cause damage to component parts of the grate, or to cause partial or complete destruction of the grate. Thus, the compensating device becomes ineffective as soon as it is fully compressed prior to heating of adjacent grate bars to the maximum temperature. Moreover, the compensating device cannot expand to compensate for contraction of mobile grate bars as a result of cooling because particles of foreign matter which have penetrated between the stationary bars and the compensating device remain entrapped and hold the compensating device against expansion. The result is that the mobile grate bars are separated from the compensating device by extremely wide gaps which permit practically unobstructed descent of solid matter into the space therebelow. Moreover, when the pressure between the compensating device and the adjacent grate bars reaches a certain value, the mobile grate bars jam, i.e., they are incapable of reciprocating relative to the other grate bars. This interrupts or reduces the effectiveness of the aforementioned self-cleaning action of mobile bars. In fact, the pressure can reach a value at which the bars break or yield upwardly to develop gaps between the neighboring steps of the grate. Such gaps also permit solid particles (namely, the burning fuel) to pass through the grate. The particles cause further lifting of the raised bars and are likely to cause a complete breakdown of the grate. Excessive pressure between the grate bars and the compensating device further affects the operation of and/or causes damage to the mechanism which reciprocates the mobile grate bars.

As mentioned above, penetration of some solid particles between the compensating device and the mobile grate bars is undesirable but less damaging than the entry of such particles between the compenating device and stationary bars. This is due to the fact that the particles which are entrapped between the mobile bars and the compensating device are likely to be expelled owing to the aforediscussed self-cleaning action whereas a particle which penetrates between the compensating device and the stationary bars remains entrapped and facilitates the entry of additional foreign matter.

OBJECTS AND SUMMARY OF THE INVENTION

An object of the invention is to provide a novel and improved grate wherein the penetration of solid matter between the compensating device or devices and the adjacent grate bars is less likely than in heretofore known grates.

Another object of the invention is to provide a grate wherein the compensating device and the steps of the grate are constructed and assembled in such a way that particles of foreign matter cannot penetrate between the compensating device and the stationary grate bars.

A further object of the invention is to provide a grate wherein the mobile grate bars are less likely to jam and/or be damaged than in heretofore known grates.

An additional object of the invention is to provide the grate with novel and improved means for preventing entry of particles of solid matter between the compensating device or devices and the adjacent stationary and/or mobile grate bars.

A further object of the invention is to provide a grate wherein the compensating device is less likely to undergo maximum compression or contraction and to remain in fully contracted condition than in conventional grates.

Another object of the invention is to provide a grate which can be used with advantage as a superior and longer-lasting substitute for presently known grates.

A further object of the invention is to provide the grate with novel and improved means for bridging eventual clearances between the compensating device or devices and the adjacent grate bars.

The invention is embodied in a grate for industrial furnaces or the like. The grate comprises alternating aligned elongated first and second grate bars which partially overlap each other and each of which includes a marginal portion having a top face and a side face, means for reciprocating the second bars lengthwise or substantially lengthwise with respect to the first bars, a mobile compensating device which is adjacent to the marginal portions of the bars, one or more weights, one or more springs or other suitable means for yieldably urging the compensating device toward the bars, and sealing means including auxiliary bars interposed between the second bars and the compensating device. The auxiliary bars abut the side faces of marginal portions of the second bars and overlie the top faces of marginal portions of the first bars. The side faces of marginal portions of the first bars are out of contact with the compensating device and auxiliary bars, and the clearance or gaps which are thus established adjacent to the side faces of marginal portions of the first bars are overlapped by the auxiliary bars.

The sealing means can further comprise means for coupling the auxiliary bars to the compensating device so that the auxiliary bars share the movements of the compensating device in a direction toward the side faces of marginal portions of the first and second bars. The undersides of auxiliary bars abut against and conform to the top faces of the first grate bars so that any foreign matter which happens to penetrate between the auxiliary bars and the side faces of second bars is prevented from entering the aforementioned clearances or gaps because the undersides of the auxiliary bars lie flush against the top faces of the respective first grate bars.

The novel features which are considered as characteristic of the invention are set forth in particular in the appended claims. The improved grate itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
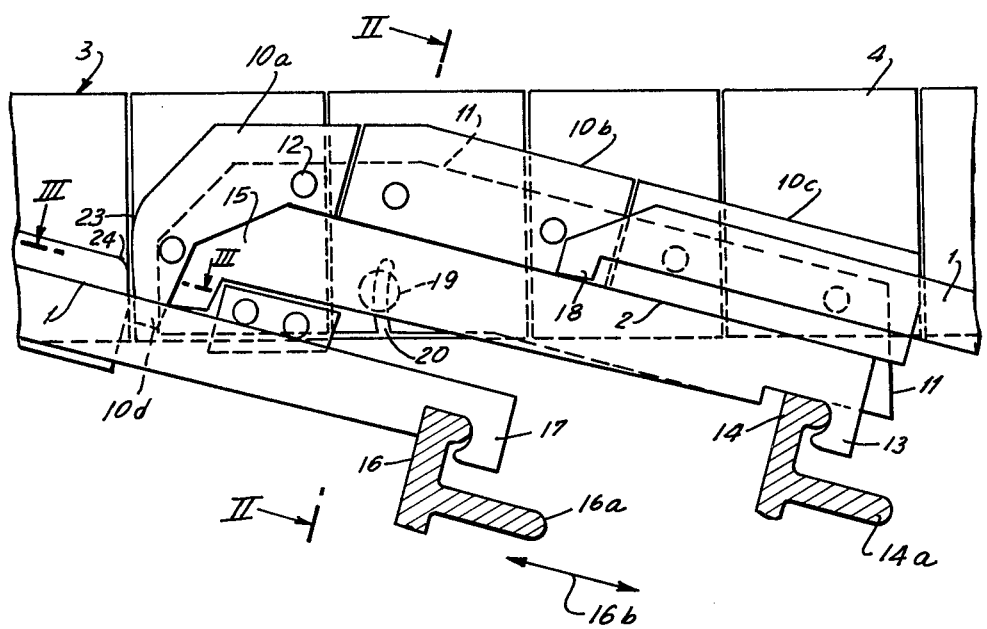
FIG. 1 is a fragmentary side elevational view of a grate which embodies one form of the invention.
Figure 2:
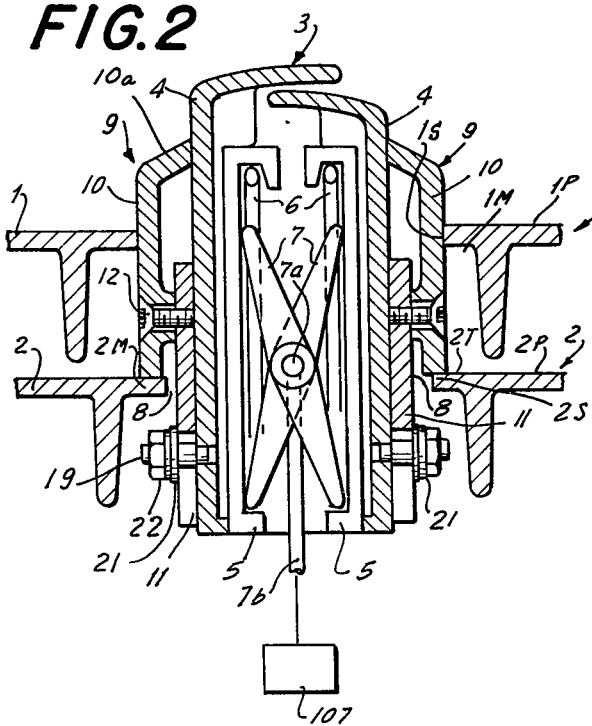
FIG. 2 is an enlarged transverse sectional view as seen in the direction of arrows from the line II—II of FIG. 1.
Figure 3:
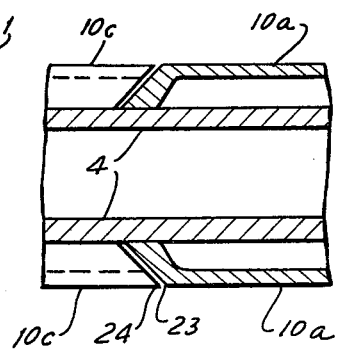
FIG. 3 is a sectional view as seen in the direction of arrows from the line III—III of FIG. 1.

The grate which is shown in FIGS. 1 to 3 comprises several steps of grate bars including elongated stationary grate bars 2 which alternate with elongated mobile grate bars 1. As shown in FIG. 1, each stationary grate bar 2 partially overlaps a first mobile bar 1 and is partially overlapped by a second mobile bar 1. It is to be noted that FIG. 1 merely shows one bar of each step, namely, the outermost bar which is adjacent to the respective side of a compensating device 3. FIG. 2 shows that the compensating device 3 is installed between two groups of steps, namely, a first group at one side and a second group at the other side of the two mobile components 4 of the device 3. If the grate ends at the right-hand or left-hand side of the compensating device 3, the latter is adjacent to the marginal portion of the frame or support for the grate bars. The components 4 of the compensating device 3 are mounted on holders 5 which are pivotable on supports 6 and are biased apart by a system of intersecting two-armed levers 7. The common shaft 7a of the levers 7 is connected to a rod 7b which carries a weight 107. Thus, and since the weight 107 tends to move the shaft 7a downwardly, the angles between the upper and lower arms of the levers 7 tend to increase so that the holders 5 tend to move the components 4 of the compensating device 3 apart, i.e., toward the marginal portions of the respective grate bars 1 and 2. A compensating device which can be used in the grate of the present invention is disclosed in the aforementioned commonly owned U.S. Pat. No. 4,096,809 to Martin et al. The disclosure of this patent is incorporated herein by reference. The patent shows several groups of steps of grate bars and further shows compensating devices between such groups as well as along the sides of the grate. With reference to FIG. 2, the right-hand component 4 of the compensating device 3 is yieldably urged toward the marginal portions 1M and 2M of the adjacent (right-hand) grate bars 1 and 2.

The right-hand component 4 of FIG. 2 is spaced apart from the marginal portions 1M and 2M because the grate further comprises a sealing unit 9 which is interposed between the right-hand component 4 and the marginal portions 1M and 2M. An auxiliary bar 10 of the sealing unit 9 is biased directly against the side face 1S of the marginal portion 1M, and a carrier 11 for the auxiliary bar 10 is spaced apart from the side face 2S of the marginal portion 2M. The underside of the auxiliary bar 10 rests on the top face 2T of the marginal portion 2M. Thus, any particles of foreign matter which happen to penetrate between the side face 1S and the auxiliary bar 10 descend (in response to reciprocatory movement of the bar 1) onto the platform 2P of the stationary grate bar 2 therebelow, i.e., such particles cannot enter the clearance or gap 8 between the side face 2S and the carrier 11 because the underside of the auxiliary bar 10 rests on and follows the outline of the top face 2t of the marginal portion 2M. The construction of the left-hand sealing unit 9 of FIG. 2 is identical to that of the right-hand sealing unit 9; these sealing units are mirror symmetrical to each other with reference to a vertical plane which includes the axis of the shaft 7a.

FIG. 1 shows that each auxiliary bar 10 is assembled of several plate-like sections 10a, 10b, 10c which are bolted, riveted or otherwise connected to each other and consist of a highly heat- and wear-resistant material in order to insure that they can stand long periods of use in spite of the fact that they are in permanent frictional engagement with the side face 1S of the marginal portion 1M of the respective mobile grate bar 1. The auxiliary bar 10 is secured to the respective carrier 11 by screws 12 or analogous fasteners. As mentioned above, the outline of the underside of the auxiliary bar 10 matches the outline of the respective top face 2T so that the parts 2 and 10 form a seal which prevents penetration of foreign matter from the upper side of the platform 2P toward and into the clearance or gap 8.

Each stationary grate bar 2 has a first or rear end portion 13 which overlies a rail 14 of a stationary frame or support 14a for the respective step (consisting of a row of stationary grate bars 2). The other (front) end portion or head 15 of the stationary grate bar 2 rests on the platform 1P of the adjacent mobile grate bar 1. This is shown in FIG. 1. The rear end portions 17 of mobile grate bars 1 are attached or simply overlie the rails 16 of reciprocable frames or supports 16a which constitute a means for moving the bars 1 lengthwise with respect to the bars 2. The directions in which the frame 16a of FIG. 1 is reciprocable are indicated by a double-headed arrow 16b. The front end portion or head 18 of each mobile grate bar 1 rests on the platform 2P of the adjacent stationary bar 2. It will be noted that the grate bars 1 and 2 form a scalloped layer wherein the bars 1 alternate with the bars 2 (as considered in the directions indicated by the arrow 16b) and wherein the rear end portion 17 of each bar 1 is attached to the respective rail 16 and is overlapped by the front end portion 15 of the respective stationary bar 2, and wherein the front end portion 18 of each bar 1 rests on the platform 2P of the adjacent bar 2.

The carriers 11 of each sealing unit 9 extend upwardly beyond the platforms 2P of the adjacent bars 2, i.e., the fasteners 12 are located at levels above the respective top faces 2T. The auxiliary bars 10 are biased against the respective component 4 of the compensating device 3 by elastic washers 21 which are interposed between nuts 22 and the outer sides of the carriers 11 and mesh with the shanks of bolts 19 which are affixed to the respective components 4 (see FIG. 2). Since the heads 15 of stationary bars 2 abut against the platforms 1P of the adjacent mobile bars 1, such heads undergo a certain amount of wear, i.e., their downwardly extending tips become shorter after a certain period of use. In the absence of any remedial action, the heads 15 would hang in the air and foreign matter could penetrate along the platforms 1P and toward the rear end portions 17 of the respective mobile bars 1. The grate of FIGS. 1 to 3 is constructed and assembled in such a way that the heads 15 of stationary bars 2 can descend to the extent which is necessary to compensate for wear upon their lower end faces, and such downward movements are shared by the respective auxiliary bars 10. As shown in FIG. 1 and 2, the rear end portions of the carriers 11 rest on and are pivotable with respect to the corresponding rails 14. In addition, the front end portions or intermediate portions of the carriers 11 are formed with arcuate slots 20 for the shanks of the respective bolts 19 so that the carriers 11 and the associated auxiliary bars 10 can pivot with the adjacent bars 2 to the extent which is needed to compensate for wear upon the heads 15 as a result of frictional engagement with the mobile grate bars 1. The bias of resilient (metallic or elastomeric) washers 21 suffices to urge the carriers 11 against the respective components 4 of the compensating device 3 but does not prevent pivotal movements of the carriers with respect to the rails 14 in order to compensate for wear upon the heads 15 of stationary grate bars 2. The washers 21 bias the carriers 11 against the respective components 4; at the same time, the washers 21 also bias the auxiliary bars 10 against the respective components 4 because the screws 12 establish a rigid connection between each carrier 11 and the corresponding auxiliary bar 10. This, too, insures that foreign matter cannot penetrate into the clearances 8 even if such foreign matter happens to enter between the bars 1, 10 and descends onto the platforms 2P. The upper portion of each auxiliary bar 10 has an inclined surface 10A which slopes downwardly and away from the respective component 4 to insure that foreign particles which descend onto the surface 10A are caused to advance toward the center of the respective step of the grate, i.e., away from the clearances 8.

The front sections 10a of auxiliary bars 10 include beak-shaped portions 10d which have rearwardly and outwardly inclined front end faces 23 closely adjacent to and may but need not abut against the rear end faces 24 of rear sections 10c of the preceding auxiliary bars 10. This reduces the likelihood of penetration of foreign matter into contact with the respective component 4. The sections 10a resemble beaks (see FIG. 1). One of the end faces 23, 24 is preferably concave and the other of these end faces is convex so as to insure that such end faces are closely adjacent to each other. FIG. 3 shows that a narrow gap can be left between the end faces 23, 24 in order to compensate for variations in the length of neighboring auxiliary bars 10 as a result of temperature changes. The auxiliary bars 10 at each side of the compensating device 3 form a file of aligned elongated auxiliary bars (see FIG. 3 which shows two bars 10 of each of the two files). FIG. 3 also shows the inclination of the end faces 23, 24; the inclination is such that the rear section 10c of a preceding bar 10 overlies the front section 10a of the next-following bar 10.

An important advantage of the improved grate is that the clearances 8 remain free of foreign matter and the compensating device 3 is always free to follow the movements of the marginal portions 1M in directions to the left or to the right, as viewed in FIG. 2. Moreover, the device 3 cannot be held in compressed condition when the bars 1 move away from the vertical symmetry plane including the axis of the shaft 7a. This is attributable to the feature that the width of the clearance 8 cannot be reduced to zero and that the auxiliary bars 10 abut against the top faces 2T of the adjacent marginal portions 2M to thereby prevent entry of solid particles into the clearances 8. The contact between the auxiliary bars 10 and the respective top faces 2T cannot be interrupted as a result of wear upon and ensuing pivotal movements of the bars 2 because the auxiliary bars 10 are free to share such pivotal movements. It has been found that the improved grate requires a minimum of maintenance and/or repair and that the useful life of grate bars 1, 2 and compensating device 3 is much longer than that of corresponding parts in conventional grates.

Another feature of the improved grate is that each sealing unit 9 comprises discrete auxiliary grates 10 and carriers 11. The carriers 11 are less likely to undergo pronounced wear than the bars 10. Therefore, the bars 10 can be made of a material whose resistance to heat and wear is more pronounced than that of the carriers 11. This entails substantial savings in expensive material. As a rule, the entire grate consists of metallic material. The material of auxiliary bars 10 is preferably an alloy whose brittleness normally exceeds that of the material of carriers 11. Such carriers may be made of rolled steel.

The washers 21 or analogous elastomeric or resilient biasing means insure that the carriers 11 and their auxiliary bars 10 invariably bear against the respective components 4 of the compensating device 3. As mentioned above, the washers 21 do not prevent pivotal movements of the carriers 11 and their bars 10 in response to wear upon the heads 15 of the stationary bars 2. It will be noted that, even though the bars 2 are normally stationary, they are free to perform all such (pivotal) movements which are needed to compensate for the results of their frictional engagement with the mobile bars 1. In other words, the mounting of bars 2 is not rigid; however, they need not perform pronounced reciprocatory movements with or relative to the bars 1.

In the embodiment of FIGS. 1 to 3, the bars 10 constitute the sole means for preventing or reducing the likelihood of penetration of solid matter between the reciprocable bars 1 and the corresponding components 4 of the compensating device 3. Thus, the distance between the compensating device 3 and the bars 1 invariably equals the width of auxiliary bars 10 therebetween. The washers 21 urge the bars 10 against the components 4, and the weight 107 urges the bars 10 against the side faces 1S of the marginal portions 1M.

Under certain circumstances, particles of fuel or residues of fuel can penetrate between the end faces 23 and 24 of neighboring auxiliary bars. This can interfere with mobility of neighboring auxiliary bars of the respective file with respect to each other or can cause complete blocking of any relative movement. Once an auxiliary bar 10 is blocked, it cannot follow the movements of the adjacent stationary grate bar 2 (as a result of wear upon the head 15 of the stationary bar) with the result that the bars 2 and 10 define gaps which allow for penetration of foreign matter into the clearances 8. In other words, the inability of an auxiliary bar 10 to pivot with respect to the neighboring auxiliary bars of the same file would enable the stationary bar 3 therebelow to pivot about the respective rail 14 and to move the top fact 2T of its marginal portion 2M away from the underside of the adjacent auxiliary bar 10.

Figure 4:
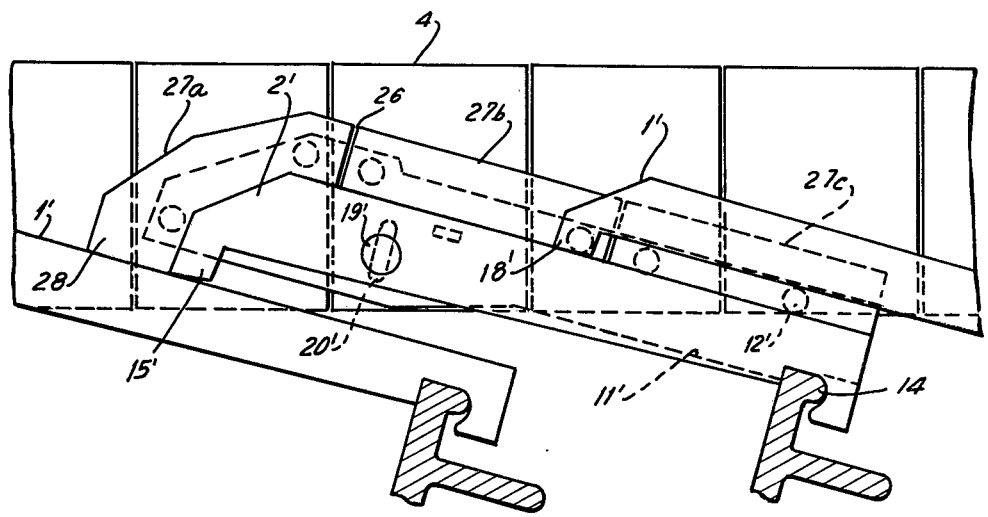
FIG. 4 is a fragmentary side elevational view of a modified grate.
Figure 5:
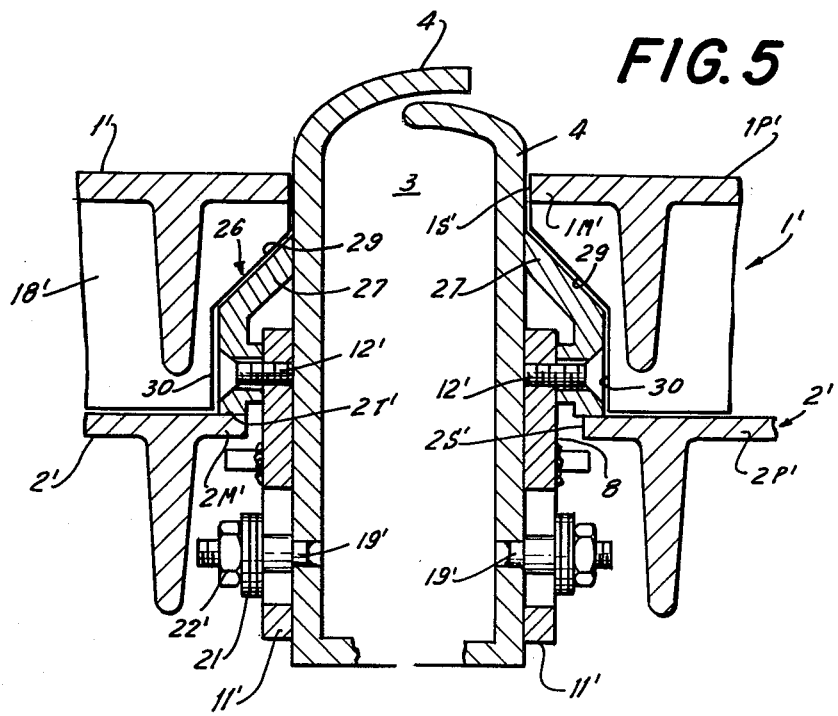
FIG. 5 is an enlarged transverse sectional view as seen in the direction of arrows from the line V—V of FIG. 4.

The grate of FIGS. 4 and 5 is constructed and assembled with a view to prevent or reduce the likelihood of blocking of necessary movements of auxiliary bars (shown at 27) with respect to the adjacent stationary grate bars 2'. The auxiliary bars 27 form part of the corresponding sealing units 26 which are disposed at the opposite sides of the compensating device 3, i.e., at the outer sides of the respective components 4 which are urged apart in the same way as described in connection with FIG. 2 or as disclosed in the aforementioned U.S. Pat. No. 4,096,809 to Martin et al. An important difference between the sealing units 9 and 26 is that the auxiliary bars 27 of each of the units 26 do not contact each other. Instead, and as shown in FIG. 4, each auxiliary bar 27 overlies the respective stationary bar 2' in its entirety and its foremost section 27a resembles a beak which overlies and whose underside closely follows the outline of the adjacent front end portion or head 15' of the respective stationary grate bar 2'. The head 28 of the section 27a rests directly on the platform 1P' of the adjacent mobile grate bar 1'. Each auxiliary bar 27 is assembled of several plate-like sections 27a, 27b, 27c consisting of heat- and wear-resistant material and being secured to each other by bolts, rivets or other suitable fastener means. The fasteners which secure the auxiliary bars 26 to their carriers 11' are shown at 12'.

In order to insure that the auxiliary bars 27 will prevent penetration of foreign matter into the clearances 8 between the side faces 2S' of marginal portions 2M' of the respective stationary bars 2' and the carriers 11' for the bars 27, the marginal portions 1M' of mobile bars 1' are formed with recesses which are bounded by mutually inclined surfaces 29, 30 which receive the respective auxiliary bars 27 (see FIG. 5). The marginal portions 1M' may but need not abut directly against the respective components 4 of the compensating device 3. The recesses which are bounded by internal surfaces 29, 30 need not extend along the full length of the respective marginal portions 1M', as long as their length suffices to insure that the heads 18' of mobile grate bars 1' extend into such recesses in each position of the bars 1'. It will be noted that the auxiliary bars 27 also comprise top surfaces which slope outwardly and downwardly away from the respective components 4 of the compensating unit 3 to steer particles of foreign matter onto the platform 2P' of the stationary bars 2' therebelow whereby the particles are less likely to advance toward and into the clearances 8, especially since the undersides of the bars 27 conform to the outlines of the upper sides of adjacent bars 2'. The feature that the marginal portions 1M' of the mobile bars 1' abut directly against or are immediately adjacent to the corresponding components 4 reduces the likelihood of penetration of foreign matter to a level below the platforms 1P' in the spaces between consecutive auxiliary bars 27. As stated above, the bars 27 at each side of the compensating device 3 are not disposed end-to-end but form a single file of auxiliary bars wherein the neighboring auxiliary bars are spaced apart from each other.

Since the heads 28 rest on the platform 1P' of the bars 1', the same as the heads 15' of stationary bars 2', the wear upon such heads is equally pronounced (at least when the material of the heads 28 is the same as that of the heads 15') so that the auxiliary bars 27 pivot about the rails 14 when the bars 2' pivot as a result of wear between the undersides of their heads 15' and the platforms 1P' of the respective reciprocable bars 1'. The auxiliary bars 27 are free to pivot with the respective stationary bars 2' because they have elongated arcuate slots 20' (see FIG. 4) for the bolts 19' which connect the carriers 11' to the respective components 4 of the compensating device 3. The bolts 19' mesh with nuts 22' and are surrounded by elastic or resilient washers 21' which bias the carriers 11' against the outer sides of the respective components 4. The bolts 19' can be welded or otherwise fixedly secured to the components 4.

The heads 18' rest on the respective auxiliary bars 27, i.e., the bars 27 are urged downwardly by the respective overlapping mobile grate bars 1'. This insures that the heads 28 of the front sections 27a invariably rest by gravity on the adjacent mobile bars 1', namely, of bars 1' which precede the bars 1' resting on the corresponding auxiliary bars 27. Due to the provision of recesses which are flanked by the surfaces 29 and 30, the entire side faces 1S' of marginal portions 1M' of the mobile grate bars 1' abut against the respective components 4 of the compensating device 3.

The grate of FIGS. 4–5 exhibits the advantage that the auxiliary bars 27 of each of the two sealing units 26 are invariably free to move relative to each other because such auxiliary bars are not disposed end-to-end. Consequently, the bars 27 are free to share all movements of the adjacent bars 2' and thus remain in contact with the respective top faces 2T'. Some movements of the bars 2' are unavoidable, especially after a certain period of use, because the bars 2' are subject to wear as a result of contact with the mobile bars 1'. As a rule, the bars 2' will move slightly up and down in response to reciprocation of the bars 1'. In contrast to the grate of FIGS. 1–3 wherein foreign matter between the end faces 23, 24 could interfere with movements of auxiliary bars 10 in response to movements of the bars 2, the bars 27 of FIGS. 4–5 are spaced apart and, therefore, they are even more likely to share all stray movements of the adjacent bars 2'. In fact, the bars 27 are compelled to move with the adjacent bars 2' because their heads 28 rest on the same platforms 1P' as the respective heads 15'.

The sockets or recesses which are bounded by the surfaces 29, 30 further reduce the likelihood of penetration of solid particles into the clearances 8. This will be readily appreciated since the auxiliary bars 27 extend into such recesses and thereby greatly reduce the likelihood of penetration of solid particles between the components 4 and the side faces 1S', thereupon along the surfaces 29, 30, then between the top faces 2T' and auxiliary bars 27, and finally into the clearances 8. The side faces 1S' bear directly against the adjacent components 4. Therefore, the marginal portions 1M' seal the spaces between successive spaced-apart auxiliary bars 27 of the respective sealing devices 26. Thus, the arrangement of FIGS. 4–5 renders it unnecessary to provide two files of immediately adjacent or abutting auxiliary bars and obviates the need for machining of the end faces of auxiliary bars.

Figure 6:
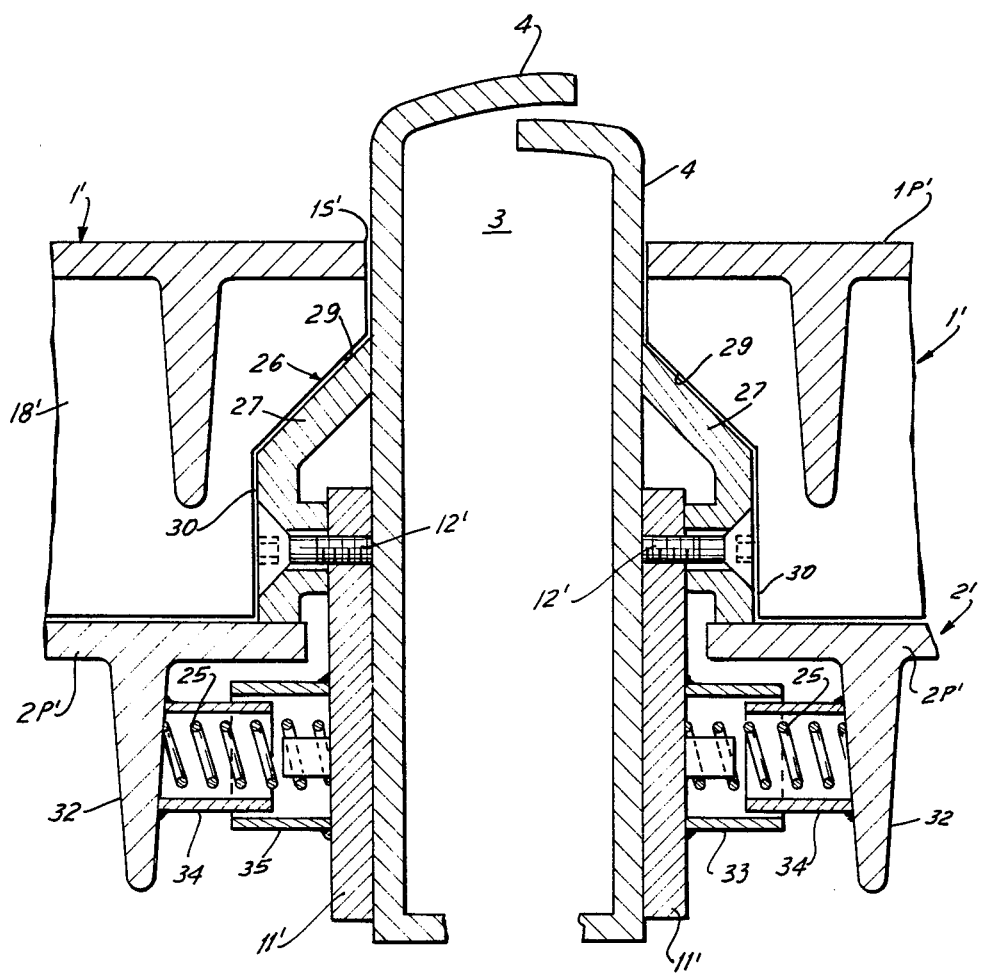
FIG. 6 is a sectional view similar to that of FIG. 5 but showing a third grate.

FIG. 6 illustrates a portion of a grate which constitute a modification of the grate of FIGS. 4 and 5. All such parts of the grate of FIG. 6 which are identical with or clearly analogous to corresponding parts of the grate of FIGS. 4–5 are denoted by similar reference characters. The difference between the embodiments of FIGS. 4–5 and FIG. 6 is that the auxiliary bars 27 of FIG. 6 are not coupled to the respective components 4 of the compensating device 3 but are supported exclusively by the respective stationary grate bars 2', i.e., the bars 27 rest on the adjacent bars 2' by gravity. The carriers 11' are not coupled to the adjacent components 4 but are merely biased against such components by helical springs 25 which react against the downwardly extending projections or ribs 32 of the respective stationary grate bars 2' and bear against the carriers 11' to urge these carriers (and hence the corresponding auxiliary bars 27) against the adjacent components 4. The mobile grate bars 1' overlie and rest on the respective auxiliary bars 27 so that the bars 27 are invariably held in contact with the platforms 2P' of the stationary bars 2' therebelow. This insures that the bars 27 follow all pivotal movements of the bars 2' (such pivotal movements are attributable to wear upon the heads of the bars 2' as a result of frictional engagement with the platforms 1P' of the adjacent overlapped mobile bars 1').

Each spring 25 is confined in a pair of sleeves 33, 34 which are partially telescoped into each other and are respectively welded or otherwise affixed to the carriers 11' and ribs 32. The sleeves 33, 34 shield the springs 25 from heat and guide the springs as well as the respective carriers 11'.

The configuration of recesses (bounded by surfaces 29 and 30) is the same as in the embodiment of FIGS. 4 and 5. Here, too, the upper surfaces of auxiliary bars 27 slope downwardly and outwardly away from the respective components 4 to steer particles of foreign matter which descend onto such surfaces toward the centers of the corresponding steps of the grate.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. In a grate for industrial furnaces or the like, the combination of alternating aligned elongated first and second grate bars which partially overlap each other, said bars including marginal portions having top faces and side faces; means for reciprocating said second bars lengthwise with respect to said first bars; a mobile compensating device adjacent to said marginal portions of said bars; means for yieldably urging said device toward said bars; and sealing means including auxiliary bars interposed between said second bars and said device, said auxilary bars abutting the side faces of marginal portions of said second bars and overlying the top faces of marginal portions of said first bars, said side faces of said first bars being out of contact with said device and said auxiliary bars.

2. The combination of claim 1, wherein said sealing means further comprises means for coupling said auxiliary bars to said device so that said auxiliary bars share the movements of said device in a direction toward said side faces.

3. The combination of claim 1, wherein said auxiliary bars have undersides abutting against and conforming to the top faces of marginal portions of said first bars.

4. The combination of claim 1, wherein the side faces of marginal portions of said first bars and said sealing means define clearances which are overlapped by said auxiliary bars.

5. The combination of claim 1, wherein said first bars are pivotable about substantially horizontal axes and said sealing means further comprises carriers, one for each of said first bars, said carriers being pivotable with the respective first bars and said auxiliary bars being mounted on said carriers.

6. The combination of claim 1, further comprising means for biasing said sealing means against said device.

7. The combination of claim 6, wherein said biasing means comprises springs.

8. The combination of claim 1, further comprising means for pivotably securing said sealing means to said device.

9. The combination of claim 8, wherein said sealing means comprises carriers for said auxiliary bars and said securing means connects said carriers to said device.

10. The combination of claim 1, wherein said auxiliary bars rest by gravity on said first bars.

11. The combination of claim 1, wherein said auxiliary bars form a file of abutting auxiliary bars, said second bars being reciprocable with respect to the auxiliary bars of said file.

12. The combination of claim 11, wherein the neighboring auxiliary bars of said file have overlapping end faces.

13. The combination of claim 1, wherein said auxiliary bars have first and second end portions, said first end portion of each of said auxiliary bars resting on one of said second bars and said second end portion of each auxiliary bar being overlapped by another of said second bars.

14. The combination of claim 13, wherein said other second bars have recesses for the respective end portions of said auxiliary bars.

15. The combination of claim 14, wherein said recesses are bounded by surfaces conforming to the outlines of the respective end portions of said auxiliary bars.

16. The combination of claim 1, wherein said auxiliary bars have upper surfaces sloping downwardly and away from said device.

17. The combination of claim 1, wherein each of said auxiliary bars consists of a plurality of interconnected sections.

* * * * *